Sept. 20, 1971   K. VOCKENHUBER ET AL   3,605,596
CAMERA PROVIDED WITH A DEPTH-OF-FIELD CONTROLLER
Filed Nov. 4, 1969
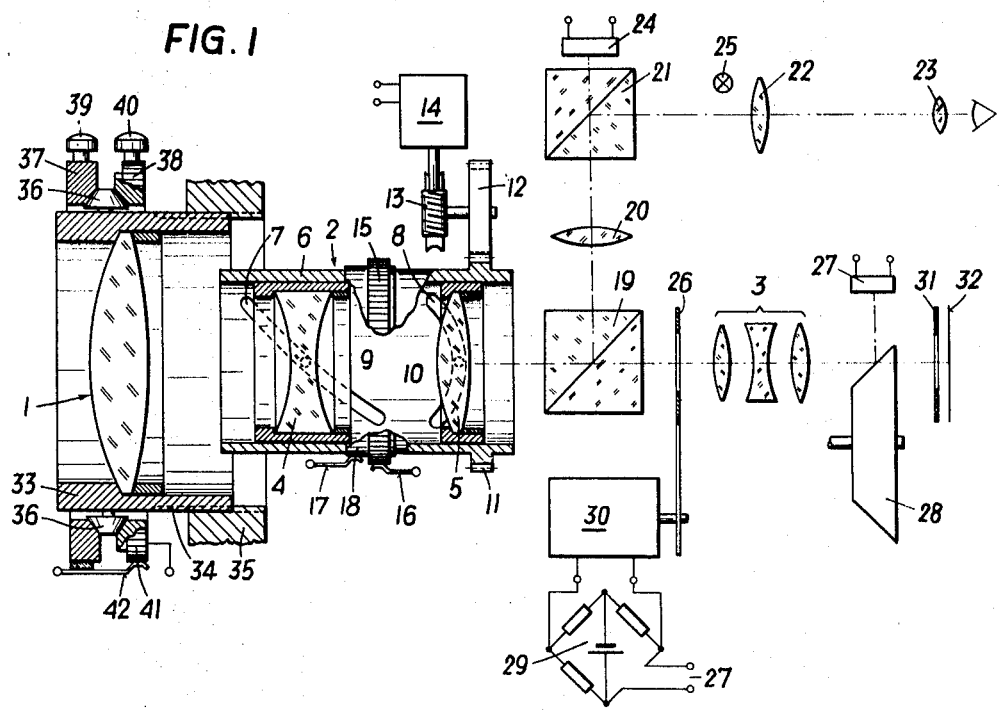
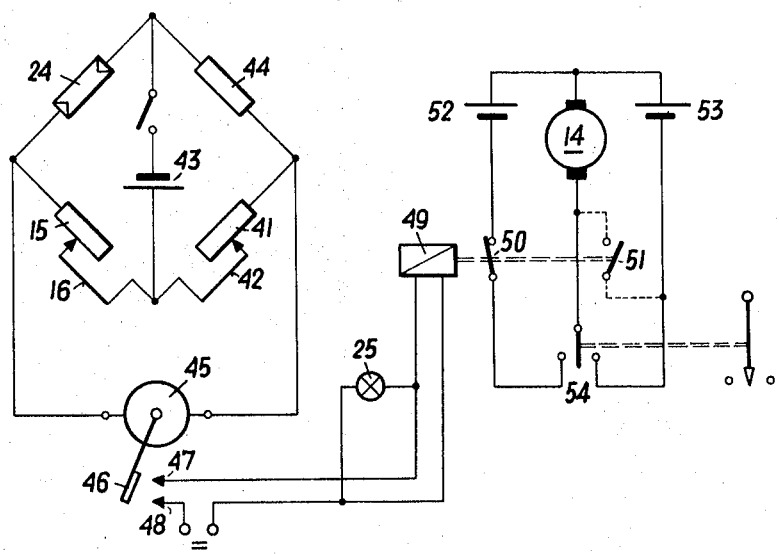

United States Patent Office 3,605,596
Patented Sept. 20, 1971

3,605,596
CAMERA PROVIDED WITH A DEPTH-OF-FIELD CONTROLLER
Karl Vockenhuber, Otto Freudenschuss, and Eduard Keznickl, Vienna, Austria, assignors to Raimund Hauser, Vienna, Austria
Filed Nov. 4, 1969, Ser. No. 873,825
Claims priority, application Austria, Nov. 5, 1968, 10,763/68
Int. Cl. C03b 3/08, 3/12
U.S. Cl. 95—44    22 Claims

ABSTRACT OF THE DISCLOSURE

A zoom lens has a varying depth of field for each focal length. Values are set corresponding to the near point and the far point of a desired object space. These values are set as resistances on either side of a bridge circuit. Connected on one side of the bridge circuit is a resistance value corresponding to the instant depth of field setting which is a combination of focal length and f-stop. Normally the bridge circuit is unbalanced in one direction but when the actual depth of field becomes smaller than the desired setting, the bridge circuit becomes balanced in the opposite direction thereby sending a circuit response which can be utilized by the operator or the camera.

---

This invention relates to a photographic or cinematographic camera which comprises an objective lens, preferably a zoom lens, and a device which enables a comparison between the near and far limits of the desired object space and the actual depth of field determined by the setting of the lens, e.g., the focus setting, the f-number setting and, possibly, the focal length setting.

It is an object of the invention to prevent photographs or shots in which the depth of field is smaller than required for a given scene so that the resulting pictures would be out of focus. This problem has not been solved with the previously known depth-of-field indicators. Particularly in motion picture cameras having zoom lenses, special difficulties arise from the fact that the focal length of the lens may be varied during the shot. By an increase in focal length, the object is often moved out of the depth of field so that the resulting image of the object is out of focus. The known depth-of-field indicators which enable the depth of field to be read from the lens mount cannot provide a remedy in that direction. The same applies to depth-of-field indicators which in accordance with known proposals are visible in the viewfinder of the camera because in cameras provided with zoom lenses enabling an arbitrary adjustment of the aspect ratio within certain limits the viewfinder system cannot be used even for an approximate rangefinding. It is known to provide a camera having a coupled rangefinder or a reflex camera with a device which serves to adjust the camera to a depth of field which is limited by the near and far points of an object to be photographed. Adjustment is effected by a change of the distance between the taking lens and the image plane and of the f-number of the taking lens. The device comprises a transmitting mechanism which consists of parts that are movable parallel and at right angles to the optical axis and which serves to adjust the distance between the taking lens and the image plane. In response to such focussing the rangefinder or the focussing screen provided with a depth-of-field indicator indicates a point N, and moves the taking lens in dependence on the set f-number to a focussed position in which the point N is a near point, whereafter the diaphragm coupled to the transmitting mechanism is adjusted so that the rangefinder or the focussing screen provided with a depth-of-field indicator indicates a point F. The taking lens is thus adjusted to a setting in which point F is a far point and point N remains a near point. Whereas this device enables a comparison between the near and far points of a desired object space and the depth of field, this comparison is most complicated and in practice cannot be performed particularly in the operation of motion picture cameras in which the user of the camera must concentrate his attention on the action to be shot.

The invention solves this problem by the provision of preselectors for focussing the lens to the near and far points, respectively, of the object space, and of a comparator which consists of an automatic calculator and in the case of a mismatch between the desired and actual settings generates a pulse which is applied to an indicating and/or control device. The pulse which is generated by the calculator may be an electric or mechanical pulse.

In a preferred embodiment of the invention, the indicator consists of a known visual signaling device, which is preferably visible in the viewfinder. In certain applications it may be desirable to provide an audible signaling device. In a development of the invention, a zoom lens camera comprises disabling means for disabling the zooming device and that disabling means are adapted to be controlled by the pulse delivered by the comparator and to prevent the zooming device from increasing the focal length when the depth of field is as large as or smaller than the preselected object space. In a camera in which the zooming device is driven by an electric motor, the circuit of the zooming motor may include a switch which is arranged to deenergize the motor when the depth of field is as large as or smaller than the preselected object space.

Further features of the invention will become apparent from the following description of an embodiment shown by way of example in the drawing, in which:

FIG. 1 is an axial sectional view showing the optical system of a motion picture camera and FIG. 2 is a corresponding electric circuit diagram.

The optical system shown in FIG. 1 and belonging to a motion picture camera comprises a zoom lens, which is composed of a front lens element 1, a variator 2 and a prime lens 3. The variator 2 consists of two relatively displaceable elements 4 and 5. The mounts of the elements 4 and 5 are longitudinally displaceable by a barrel 6. Means are provided which are not shown in the drawing and hold the lens elements against a rotation so that they cannot follow a rotation of a barrel 6. The barrel 6 is formed on its inside with cam slots 7 and 8, which receive pins 9 and 10 secured to the mounts of the lens elements 4 and 5. During a rotation of the barrel 6, the two cam slots 7 and 8 adjust the lens elements 4 and 5 so that their magnification ratio is varied continuously whereas the backfocus of the variator remains constant. The barrel 6 carries on its outside periphery an annular gear 11, which is in mesh with a gear 12 that is driven by a motor 14 by means of a worm gearing 13. The barrel 6 also carries a rheostat 15, which is contacted by a stationary wiper 16. Another stationary wiper 17 contacts a contact path 18, which is connected to one end of the resistor 15. The resistor 15 and the contact path 18 are electrically insulated from the barrel 6. A partially reflecting prism 19 is disposed between the variator 2 and the prime lens 3 and deflects about 25% of the incident light into a viewfinder system having a lens 20. A prism 21 is provided to define for the viewfinder an optical axis which is parallel to the optical axis of the taking lens. The intermediate image formed by the viewfinder lens 20 is erected by a diagrammatically indicated erecting system 22 and viewed through an eyepiece, which is also diagrammatically indicated. The prism 21 is also partially reflecting and permits about 50% of the incident light to be transmitted along a straight line. That part of the light which is not reflected is received by a photoconductor 24. A signal lamp 25 is disposed outside of the field of the viewfinder.

A pivoted diaphragm plate 26 of an automatic diaphragm control device is disposed between the beam-splitting prism 19 and the prime lens 3 and is controlled by a photoconductor 27, which is illuminated by a rotating mirror shutter 28 during the movement of the pivoted plate. The photoconductor 27 is included in known manner in a Wheatstone bridge 29, which has connected in its diagonal a non-counterbalanced galvanometer 30, which acts to adjust the pivoted diaphragm plate 26. A pull-down system, not shown, is operated to move the film 32 intermittently past the exposure aperture 31 of the camera.

The front lens element 1 is axally displaceable to focus the zoom lens. The mount 33 is provided with an external screw thread 34, which is threaded into a stationary internal screw thread 35. Planet gears 36 are mounted in the mount 33 and in mesh with setting rings 37 and 38, which consist of crown wheels. Each of the adjusting rings carries a handle 39, 40. The setting ring 38 is provided with a resistor 41, which is contacted by a wiper 42, which is secured to the setting ring 37. The electrical connection to the resistor 41 and wiper 42 is effected by flexible strips, not shown, or slip rings.

The mode of operation of the novel device will be explained more fully hereinafter particularly with reference to FIG. 2. The setting rings 37 and 38 are adjustable along a common reciprocal distance scale and can be set to the near and far limits of a desired object space. The ring 37 is set to the far limit and the ring 38 to the near limit of that space. When the first-mentioned ring is rotated through an angle $\alpha 1$ and the ring mentioned in the second place is rotated through an angle $\alpha 2$, the differential gear formed by parts 36 to 38 adjusts the mount 33 of the front lens element by an angle $$a = \frac{\alpha 1 + \alpha 2}{2}$$

The lens is thus focussed so that the two limits of the object space limit the depth of field associated with a predetermined condition of the lens, which condition may be fictitious. The depth of the object space defined by the difference $\alpha 1 - \alpha 2$ is converted into an electrical resistance value by the rheostat 41 in conjunction with the wiper 42. As will be explained more fully hereinafter, this resistance value is compared with the depth of field, which is known to be a function of the $f$-number $k$ and the square of the focal length of the lens. When the depth of field is also represented on a reciprocal scale, it will be $$\Delta \bar{a} = c \frac{k}{f^2}$$

where $c$ is a proportionality constant. The $f$-number $k$ is converted into an electrical resistance value by the photoconductor 24, which receives part of the light falling through the lens. If the brightness of the scene to be shot increases, the automatic diaphragm control device will adjust the lens diaphragm 26 to a smaller aperture so that the $f$-number is increased. The light which is incident on the photoconductor 24 causes the conductivity of the photoconductor to increase. The response of that photoconductor is selected so that there is a linear relation between the $f$-number $k$ and the resistance of the photoconductor 24. Within the scope of the invention, the pivoted diaphragm plate 26 can be photoelectrically scanned to represent the $f$-number $k$ by a resistance value. For this purpose, the pivoted diaphragm plate 26 may comprise another tapering diaphragm opening, which is disposed between an incandescent lamp and a photoconductor. Said diaphragm may be shaped so as to compensate any non-linearities in the response of the photoconductor. To convert the focal length into an electrical resistance value, a resistor 15 is provided at the barrel 6 of the variator and cooperates with a stationary slider 16. The resistance of said resistor 15 varies as the square of its length. In this case too, the angle of rotation of the barrel may be converted into an electrical resistance value with the aid of a diaphragm which is connected to the barrel and disposed in the path of light from a lamp to a photoconductor. The resistors 15, 41 and 24 are included in a Wheatstone bridge, which is fed by a battery 43 and includes a fixed reference resistor 44. A non-counterbalanced moving-coil relay 45 is connected in the diagonal of the bridge and has an adjustable contact 46, which is opposite to a pair of stationary contacts 47, 48. The contacts 47, 48 are included in the circuit of a relay 49, which operates switches 50, 51, which are included in the circuit of the zooming motor 14, which is fed from batteries 52 and 53. The motor 14 is controlled by a manual switch 54. The relay 49 is shunted by an incandescent lamp 25, which is disposed in the path of rays leading to the viewfinder. The Wheatstone bridge is designed to be balanced when the value $\Delta \alpha$ represented by the resistor branch 15, 24 equals the value $\Delta \alpha$ which is represented by the resistor 41. In this case the depth of field defined by the setting of the lens equals the object space selected by the two setting handles 39 and 40. When the depth of field of the lens exceeds the object space, the moving-coil relay 45 will assume its position of rest in which the contact 46 is lifted from the pair of contacts 47, 48.

When the focal length of the lens is increased or when adverse light conditions decrease the depth of field of the lens so that said depth of field is smaller than the preset object space, the direction of current flow in the bridge diagonal will be reversed and the contact 46 of the moving-coil relay 45 will be pivotally moved in the counter-clockwise sense in FIG. 2 to close the contacts 47 and 48. When the user sees in the viewfinder that the lamp 25 is lighted, he becomes aware that the depth of field is too small. At the same time, the relay 49 interrupts the circuit between the battery 52 and the zooming motor 14 so that the focal length of the lens cannot be further increased. A switch 51 may be operated to energize the motor 14 for rotation in the opposite sense so that the focal length of the lens is automatically reduced to such an extent that the entire object space selected by the adjusting rings 37 and 38 is in focus.

The invention is not restricted to the example which has been shown. Instead of the Wheatstone bridge, any other circuit which functions as an analog calculator may be provided. A more rugged structure may be obtained if the moving-coil relay is replaced by an amplifier, preferably a semiconductor amplifier. Finally, the camera may be provided with a mechanical calculator, which is fed on one side with the values for the $f$-number and focal length and on the other side with the preselected object space.

What is claimed is:

1. A camera which comprises
an objective lens which is adjustable to vary its depth of field,
a near point preselector which is adjustable to a position corresponding to the near point of a desired object space,
a far point preselector which is adjustable to a position corresponding to the far point of said desired object space,
an automatic calculator which is operatively connected to said lens and said near and far point preselectors and arranged to calculate the depth of field of said lens, to compare the calculated depth of field with said desired object space defined by the positions of said near and far point preselectors and to generate a pulse in response to a mismatch between said calculated depth of field and said desired object space, and
a pulse-utilizing device which is arranged to receive and responsive to said pulse.

2. A camera as set forth in claim 1, which is a photographic camera.

3. A camera as set forth in claim 1, which is a cinematographic camera.

4. A camera as set forth in claim 1, in which
said objective lens is a zoom lens and
said automatic calculator is responsive to the focal length of said lens.

5. A camera as set forth in claim 4, in which
said calculator is arranged to generate said pulse unless said calculated depth of field exceeds said desired object space at both of said near and far points,
a zooming device is provided which is operable to selectively increase and decrease the focal length of said lens, and
said pulse-utilizing device comprises a disabling device operable in response to said pulse to prevent an increase of the focal length of said lens by said zooming means.

6. A camera as set forth in claim 5, in which
said zooming device comprises a zooming motor circuit and
said disabling device comprises a switch which is included in said circuit and arranged to open said circuit in response to said pulse.

7. A camera as set forth in claim 4, in which
said calculator is arranged to produce said pulse when said calculated depth of field is short of at least one of said far and near points, and
a zooming motor circuit is provided which is operable to selectively increase and decrease the focal length of said lens,
said pulse-utilizing device comprises switch means which are included in said circuit, and
said circuit is arranged to decrease said focal length in response to said pulse.

8. A camera as set forth in claim 1, in which
said lens is adjustable to different focus settings so as to vary its depth of field and
said calculator is responsive to the focus setting of said lens.

9. A camera as set forth in claim 8, which comprises
a focusing device for adjusting said length to different focus settings,
a transmission having two inputs respectively coupled to said preselectors, and an output coupled to said focusing device, said transmission being arranged to operate said focusing device so as to adjust said lens to such a focus setting that the near and far points corresponding to said positions of said preselectors define the depth of field associated with a predetermined condition of said lens which is independent of its focus setting.

10. A camera as set forth in claim 9, which comprises means for adjusting said lens to said predetermined condition.

11. A camera as set forth in claim 9, in which said transmission is arranged to operate said focusing device to adjust said lens to said focus setting regardless of whether or not said lens is in said predetermined condition.

12. A camera as set forth in claim 9, in which said transmission consists of a differential gear.

13. A camera as set forth in claim 1, in which
said lens is adjustable to different $f$-numbers so as to vary the depth of field and
said calculator is responsive to the $f$-number of said lens.

14. A camera as set forth in claim 1, in which said pulse-utilizing device comprises an indicating device.

15. A camera as set forth in claim 7, in which said indicating device comprises a visual signaling device.

16. A camera as set forth in claim 9, which comprises a viewfinder in which said signaling device is visible.

17. A camera as set forth in claim 1, in which said pulse-utilizing device is arranged to adjust said lens so as to match its depth of field with said desired object space in response to said pulse.

18. A camera as set forth in claim 1, in which
said calculator is arranged to generate said pulse unless said calculated depth of field exceeds said desired object space at both of said near and far points and comprises
first transducer means operatively connected to said lens and arranged to control a first set of electrical parameters representing said calculated depth of field,
second transducer means operatively connected to said near and far point preselectors and arranged to control a second set of electrical parameters representing said desired object space, and
analog calculating means which are arranged to compare said parameters and generate said pulse unless said depth of field exceeds said desired object space at both of said far and near points.

19. A camera as set forth in claim 18, in which said electrical parameters are electric resistance values.

20. A camera as set forth in claim 19, in which said analog calculating means comprises a Wheatstone bridge and a pulse generator connected in the diagonal of said bridge.

21. A camera as set forth in claim 20, in which said pulse generator comprises a galvanometer.

22. A camera as set forth in claim 20, in which said pulse generator comprises an amplifier.

References Cited

UNITED STATES PATENTS

| | | | |
|---|---|---|---|
| 2,924,146 | 2/1960 | Back | 95—45UX |
| 3,296,883 | 1/1967 | Plummer | 95—45 |
| 3,493,764 | 2/1970 | Craig | 95—44X |

SAMUEL S. MATTHEWS, Primary Examiner

M. HARRIS, Assistant Examiner

U.S. Cl. X.R.

95—45